United States Patent [19]
Wisfeld et al.

[11] 3,755,157
[45] Aug. 28, 1973

[54] METHOD OF PRODUCING DRINKING WATER FROM CONTAMINATED GROUND AND SURFACE WATER

[75] Inventors: Werner Wisfeld, Frankfurt, Main; Hans Wirth, Dortelweil; Walter Lotz, Frankfurt, Main, all of Germany

[73] Assignee: Laboratorium fur Adsorptionstechnik GmbH, Frankfurt am Main, Germany

[22] Filed: July 22, 1971

[21] Appl. No.: 165,282

[30] Foreign Application Priority Data
Oct. 10, 1970 Germany............... P 20 49 920.1

[52] U.S. Cl.................... 210/17, 210/18, 210/40
[51] Int. Cl........................ C02c 5/04, C02c 5/10
[58] Field of Search................ 210/17, 18, 29, 33, 210/39, 40, 62, 150, 151, 290, 2, 15, 16

[56] References Cited
UNITED STATES PATENTS
3,377,271  4/1968  Cann............................... 210/18 X
3,244,621  4/1966  Bouthilet........................ 210/33 X
2,992,986  7/1961  Ingram............................ 210/17
2,366,917  1/1945  Levine............................ 210/17
3,296,122  1/1967  Karassik et al.................. 210/18 X
3,658,697  4/1972  Huether.......................... 210/40 X

*Primary Examiner*—Samih N. Zaharna
*Assistant Examiner*—Thomas G. Wyse
*Attorney*—Karl F. Ross

[57] ABSTRACT

Organically contaminated water containing microorganisms is purified by first oxygenating the raw water and passing it through a coarse-particle activated-carbon bed, thereafter further oxygenating the effluent from the first bed and passing it through a second bed, and chlorinate the effluent from the latter. The water traverses the bed with a specific loading of less than 4 $hr^{-1}$, the chlorine or other disinfectant is added in an amount greater than 0.05 and less than about 0.5 mg/liter of chlorine, and only the second bed is reactivated or regenerated.

8 Claims, 1 Drawing Figure

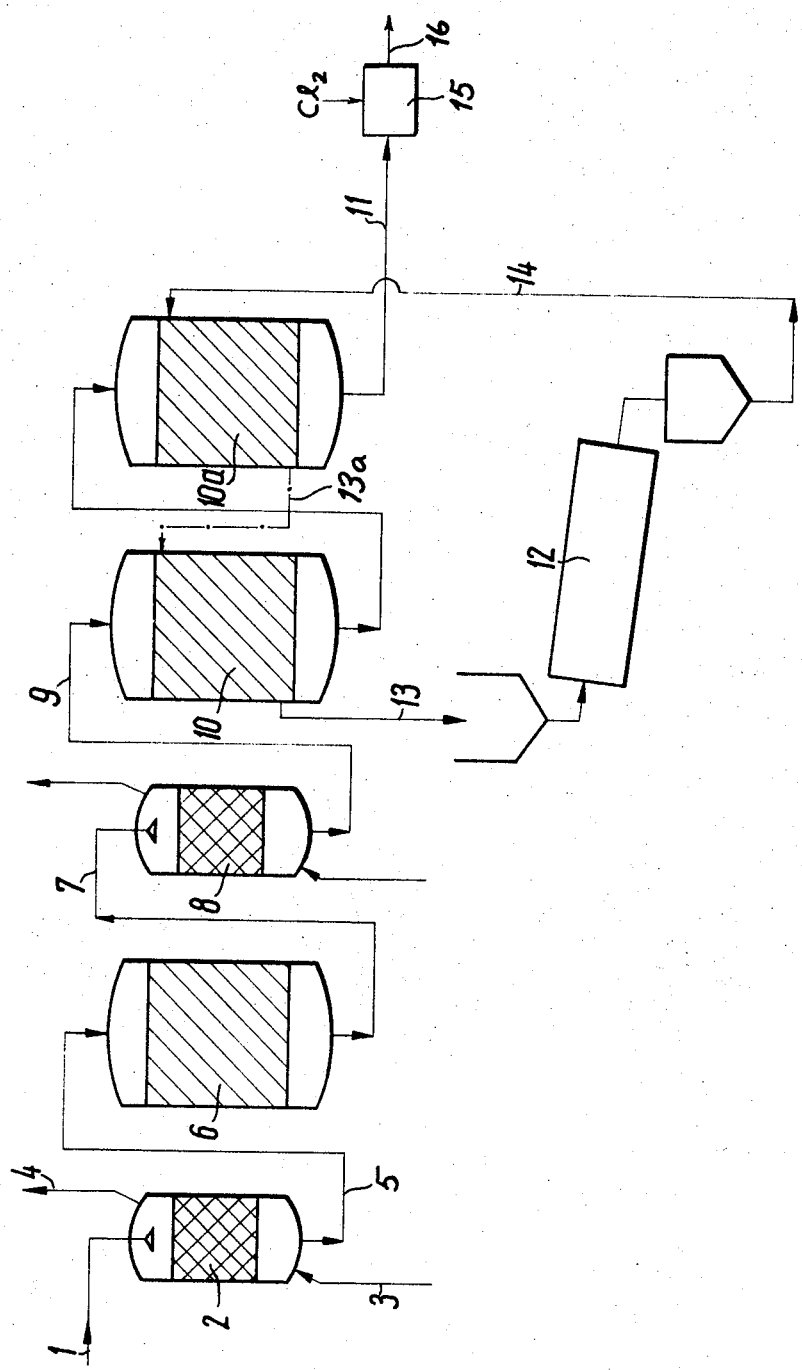

METHOD OF PRODUCING DRINKING WATER FROM CONTAMINATED GROUND AND SURFACE WATER

FIELD OF THE INVENTION

Our present invention relates to a method of purifying water containing organic contaminants and, more particularly, to a method of recovering water suitable for drinking and substantially free from micro-organisms, using organically contaminated water as a source.

BACKGROUND OF THE INVENTION

Numerous methods of purifying water have been proposed and with increasing contamination of surface or spring water, subterranean or well water and even water derived from reservoirs, some purification is required. For example, it is known to aerate such water, to chlorinate or to treat the water with other disinfectants, to filter the water and/or to subject the water to biological decontamination by treatment within activated sludge for degradation of organic impurities. Other methods have, of course, also been used but have been found to be less successful than the aforementioned techniques which may be used individually or in combination.

All of these systems have in common the desire to produce a bacillus-free, germ-free or bacteria-free water or water completely free from pathogenic micro-organisms and containing only limited quantities of nonpathogenic micro-oragnisms (say less than 100 micro-organism particles/cm$^3$ of water). Water fulfilling these requirements can be pumped into a municipal or other distribution network and is characterized as adequate drinking water or hygienically satisfactory drinking water.

In practice, however, this water is not always displaced or discharged from the network at a rate sufficient to prevent buildup of micro-organisms and even transformation of nonpathogenic micro-organisms into pathogenic species. Thus, while the total micro-organisms count of the water introduced into the network may be at most 100/cm$^3$, in relatively short periods the micro-organism count may increase to many times this value.

To limit, prevent or delay micro-organism multiplication within the water-supply network, the disinfectants mentioned above, especially chlorine, have been introduced. However, the chlorine introduced into the water may not reach all of the water in the network to break the micro-organism-growth cycle. Furthermore, the amount of chlorine or other disinfectant which must be supplied to insure limitation of the micro-organism reproduction process generally exceeds 0.5 mg/liter and is detrimental to the taste and other properties of the drinking water.

It has been proposed heretofore to reduce the micro-organism count in drinking water before it is introduced into the network by subjecting the water to a biological process involving breakdown and eventual precipitation of the micro-organisms. Organically contaminated water, for example, may be treated with strong oxidizing agents, such as ozone and chlorine (the latter forming hypochlorite upon introduction into the water) to oxidize the micro-organism, destroying pathogenic species and permit agglomeration of the organic residue such that it may be steeled or sedimented from the water or removed by filtration. Typical filter systems include activated carbon with a specific loading of, for example, $\Sigma = 10$ hr$^{-1}$. For the purposes of the present invention, and in accordance with conventional practices, the specific loading $\Sigma$ is defined as the liquid volume traversing the filter divided by the product of the activated-carbon volume and time in hours or $$\Sigma = L/C \cdot hr$$

where $L$ is the liquid volume, $C$ is the activated-carbon volume and hr represents time in hours. After such treatment, chlorination at a level of 0.5 mg/liter is nevertheless required to prevent micro-organism multiplication in the water-supply network.

It is also known, especially in cases in which the micro-organism count is low, to pass the water through an activated-carbon filter in which the absorptive capacity of the activated carbon is exploited to remove, by surface adhesion, part or all of the organic contaminants. None of the aforementioned systems are fully satisfactory. On the one hand, they require considerable quantities of chlorine or other disinfectants which may be detrimental to the taste and water quality. On the other hand, they may be insufficiently able to prevent micro-organism development in the water-supply network. Finally, the process may be so lacking in economy as to preclude anything but academic interest in them.

OBJECTS OF THE INVENTION

It is the principal object of the present invention to provide an improved method of purifying organically contaminated water, especially for the production of drinking water whereby the aforementioned disadvantages are obviated.

It is another object of the present invention to provide an improved method of producing drinking water from surface water (surface runoff, river, stream or lake water), subterranean water and, in general, organically contaminated water from any source whereby the water resulting from the method can be introduced without difficulty into a water-supply network.

It is a further object of the invention to provide a method of producing drinking water of improved quality as specified above.

Still another object of the invention resides in the provision of a method of producing hygienically clean, good-tasting water which may remain in the distribution network for long periods without material change in the micro-organism count.

It is also an object of the invention to provide a method of purifying water whereby the breakthrough of organic contamination from one stage to the final effluent is precluded.

SUMMARY OF THE INVENTION

These objects and others which will become apparent hereinafter, are attained in accordance with the present invention with a method of treating organically contaminated water, especially surface or subterranean water, prior to the passage of the treated water into a distribution network, which comprises subjecting the organically contaminated water in the presence of oxygen introduced in gaseous form into the water, to a biological breakdown upon an activated-carbon bed with a specific loading of less than four hrs$^{-1}$ ($\Sigma < 4$ hr$^{-1}$) and thereafter treating the effluent with at least 0.05 mg/liter of chlorine (at most 0.5 mg/liter) or an equivalent amount of another disinfectant, the treatment of the water upon the activated carbon for biological decontamination is carried out in at least one stage followed by at least one further stage such that the water is oxygenated with oxygen-containing gases prior to entering into a first coarse-particle bed and at least part of the effluent from the first bed is oxygen-treated prior to entry into the second fine-particle bed. The effluent from the second bed is chlorinated as indicated. Furthermore, the second bed is reactivated or regenerated, preferably continuously, while the first bed is not.

We have discovered, most surprisingly, that this combination of treatment steps affords a substantial improvement in the quality of the effluent introduced into the water-supply network of a municipality or the like. Apparently, the process depends upon a preliminary biological oxidizing degradation of organic contaminants upon the first biologically active active-carbon bed which has no significant adsorption function because of the indicated minimum specific loading. While the second bed has an adsorptive effect, it too is characterizable as biologically effective. In other words, the first and second activated-carbon beds of the present invention, operated with the aforementioned minimum specific loading, act as biological decontamination stages in which breakdown of the contaminating micro-organisms is carried out and the major portion of the organic contaminants is removed. Preferably, the specific loading ranges between $\Sigma = 3$ to $1$ hr.$^{-1}$ and the biological decontamination stage is followed by a mechanical decontamination stage (primarily adsorptive) in which the water is filtered.

According to an important aspect of this invention, the chlorination is carried out with substantially less than 0.5 mg/liter of chlorine and preferably with 0.1 to 0.3 mg of chlorine. Proportions of chlorine in excess of 0.3 mg/liter have been found to be undesirable. It has been pointed out that the chlorine, upon introduction into water, dissociates to form hypochlorite which apparently is the active species in the oxidation breakdown of the organic contaminants. When we refer to amounts of other disinfectants equivalent to a stated amount of chlorine, therefore, we mean the oxidizing equivalent of the effective hypochlorite produced upon chlorination. A typical disinfectant other than chlorine which can be used is chlorine dioxide. The activated-carbon beds of the biological active stage, according to the present invention, have a macropore volume of more than 0.5 cm$^3$/g and a BET surface in excess of 200 m$^2$/g preferably in excess of 500 m$^2$/g.

Advantageously, the two beds are of different particle size, i.e. are composed of activated-carbon particles of different average particle size or particle-size range. Preferably, the first or coarse bed makes use of larger activated-carbon particles, advantageously in a size range of 1.5 to 5 mm with best results being obtained at 2 to 4 mm. The second bed may have a particle-size range of 0.5 to 2.5 mm, preferably 0.2 to 1.5mm. However, within the indicated ranges, the average particle size of the first bed should exceed the average particle of the second bed. In addition, we may note that the total bed height to obtain a specific loading of less than 4 hrs.$^{-1}$, preferably 3 to 1 hr.$^{-1}$, will be 2 to 6 meters. Each bed may be subdivided into strata of progressively smaller particle size within the indicated ranges and, preferably, strata of smaller particle size are of greater height. Similarly, when a total height of 6 meters for both of the biologically active beds is required, the height ratio of the first bed to the second may range between 1 : 1 to 1 : 2.5, preferably about 1:2. Hence, the first bed may have a height of 2 meters whereas the second bed may have a height of 4 meters.

The initial treatment of the water with an oxygen-containing gas, according to the invention, may be effected by passing air or oxygen-enriched air counter-current to the water through a trickle tower, whereupon the oxygenated water is passed through the first bed. The aeration and the biological decontamination on the activated-carbon beds can be carried out at elevated pressure (preferably 3 to 5 atmospheres gauge). Following the biological decontamination of the water on the acticated-carbon beds, we prefer to filter the water through one or more activated-carbon beds operating primarily under adsorption principles and having little, if any, capability for biological decontamination. Prior to entry of the raw water into the system of the present invention, we may add flocculating agents to promote settling or sedimentation when colloidally dispersed impurities are present. The presence of impurities of larger particle size may call for mechanical filtration. The filter bed or beds, subsequent to the biological disinfecting stage tend to become contaminated by particles of precipitated organic matter which can be removed by conventional backwashing.

The present invention is based upon our observation that, when biological degradation and removal of micro-organisms and other impurities from oxygenated water occurs upon an activated carbon bed, regardless of the number of such beds which may be provided for the major biological activity, there eventually is some breakthrough of organic contaminants to the nonbiological side of the apparatus and eventual contamination of the final effluent. Hence, even though an adsorption filter may be provided in tandem with the biologically active stage, some biological activity, especially if the contaminated water contains microorganisms which are not readily degraded, broken down or precipitated in the biologically active stage, eventually the organic contaminants find their way into the water-supply network.

We have found, most surprisingly, that the main biologically active stage, which is not regenerated or reactivated in order to maintain the effectiveness of its bacterial flora or biological activity, should be provided upstream of a stage having primarily adsorbing capability which is continuously reactivated or regenerated by thermal processes well known in the art. Furthermore, this latter stage may comprise two or more activated carbon beds which are continuously reactivated or regenerated while the biologically active stage remains static and unperturbed by such reactivation.

While the adsorption stage sustains some biological activity, at least in the carbon beds proximal to the biologically active stage, the continuous regeneration or reactivation prevents such buildup upon the adsorptive bed or beds as might lead to a breakthrough of the organic contaminants to the final effluent. What is critical to the present invention, therefore, is a biologically active bed (or series of beds) having a specific loading $\Sigma$ less than 4 hr$^{-1}$ and downstream of a first oxygenating stage as described earlier. Downstream of this bacteriologically active stage, there is provided an adsorptive stage in which the activated carbon may also have a specific loading $\Sigma$ less than 4 hr$^{-1}$, but preferably comprising two or more activated-carbon beds through which the effluent from the biologically active first bed passes in series; the apparatus also comprises means for continuously withdrawing the activated carbon from the beds of the adsorptive stage (preferably from the bed proximal to the biological decontamination stage), for thermally regenerating or reactivating the carbon, and for returning the reactivated or regenerated carbon to the adsorptive stage (preferably at a location downstream of the point from which the carbon was removed). Thereafter, the effluent is treated with at least 0.05 mg/liter of chlorine or the sterilizing equivalent thereof.

Since the organic contaminants resistant to oxidation may remain in relatively high concentration in the first-stage effluent, we have found it to be advantageous to provide a second oxygenating tower, column or device between the main biologically active bed and the first adsorptive bed so that the latter functions simultaneously as the last biologically effective decontamination stage (because some biological removal of organic contaminants continues thereon) as well as the first adsorptive stage (since the continuous removal, replacement and regeneration of the activated carbon in this bed prevents the adsorptive capacity from being exceeded.

It has been found to be advantageous in accordance with the present invention, to maintain a coarse-grain structure for the biologically active stage and a fine-grain structure for the first adsorptive stage so that in the first stage biological growth and activity can be maintained without clogging of the pores of the activated carbon bed prematurely, while the passage of organic particles is prevented in the second bed both by adsorptive and mechanical means.

We have mentioned that the reactivation or regeneration of the activated carbon is carried out primarily by thermal means. Such thermal reactivation is well known *per se* and we merely provide mechanism for continuously (without interruption or intermittently and, preferably, periodically at a high rate) feeding the activated carbon of the first adsorptive stage out of the system and replacing it with regenerated activated carbon. The regeneration cycle should be such that the full charge of the adsorptive stage should be replaced every 30 to 90 days. Moreover, the regenerated carbon is returned to the adsorptive stage at a downstream site of the system while the activated carbon to be regenerated is withdrawn at an upstream site so that the activated carbon, in effect, moves countercurrent to the water stream prior to chlorination thereof.

It has also been found to be advantageous to provide the adsorption stage with beds of activated carbon of progressively increasing fineness from the upstream end to the downstream end of the system. In other words, the water entering the adsorptive stage is treated with coarse-grain carbon and eventually passes through beds of decreasing particle size. Thus the initial particle size at entry into the adsorptive stage may be 2 mm, followed by beds of 1.4 mm and 0.7 mm. To permit the maintenance of a particle-size distribution in this manner, the adsorption chambers may be subdivided and individually charged with regenerated particles of activated carbon. Alternatively, a plurality of adsorption vessels may be used with beds of the respective particle size.

The advantage of the present system, of course, resides in the fact that continuous reactivation permits a minimum activated-carbon volume in the adsorption unit, a maximum removal of residual contaminants and a total freedom from penetration of micro-organisms into the final effluent.

DESCRIPTION OF THE DRAWING

The above and other objects, features and advantages of the invention will become more readily apparent from the following description, reference being made to the accompanying drawing in which the sole FIGURE is a flow diagram representing an apparatus according to the present invention.

SPECIFIC DESCRIPTION

In the drawing, we show an installation for the purification of raw water, e.g. river water, which is organically contaminated and is introduced into the system at 1. At the upstream site of the system there is provided a trickle tower 2 into which the raw water is introduced and in which the raw water is passed countercurrent to a stream of oxygen-containing gas (air or oxygen-enriched air) introduced through the duct 3 and vented at 4 to the atmosphere.

A conduit 5 delivers the oxygenated raw water to the biologically active stage 6 constituted by an activated carbon bed operated with a specific loading $\Sigma$ of less than $4\,hr^{-1}$, preferably between $3\,hr^{-1}$ and $1\,hr^{-1}$. The effluent from this bed, free from all readily degradable organic contaminants and much of the organic contamination of the raw water, is delivered via line 7 to a second trickle tower 8 in which this effluent is further oxygenated in countercurrent to an air stream.

From the trickle tower 8, the oxygenated first effluent is fed at 9 to the first absorptive stage 10 formed by a bed of activated carbon of smaller particle size than the bed 6. The effluent from bed 10 may be passed into bed 10a which also is charged with activated carbon, preferably with a particle size less than that of bed 10 if it is to be regenerated separately. The final effluent at 11 is passed through a chlorinator 15 before being delivered at 16 to the water distribution network.

SPECIFIC EXAMPLE

Raw river water with a permanganate value of 21 mg $KMnO_4$ per liter and an ammonia value of 0.8 $mg(NH_4+)$ per liter is treated in the apparatus illustrated in the drawing. The permanganate value is determined by titration of the raw water with 0.1 N $KMnO_4$ solution to the first appearance of the permanganate color and the quantity of the manganate calculated in terms of mg of solid potassium permanganate per liter of titrated raw water.

The raw water is introduced at 1 to the trickle tower 2 and therein passed countercurrent to an oxygen-containing gas stream, e.g. air or oxygen-enriched air containing 50 percent by volume oxygen. The air or oxygen-enriched air is introduced in sufficient quantity to raise the oxygen content of the raw water to 10.8 mg per liter at line 5. The oxygen-containing raw water is then passed into the activated carbon filter 6 which is characterized by a specific loading $\Sigma = 2\,hr^{-1}$ for the residence time of 25 minutes to produce the first effluent at line 7. The first effluent, upon testing, if found to have a permanganate value of 9.1 mg per liter. This first effluent is introduced into the trickle tower 8 in which it is treated with oxygen-containing gas as previously described to raise the oxygen content at discharge from the tower to 11 mg per liter, whereupon the oxygenated first effluent is introduced into the first of a pair of series-connected adsorption filters 10 and 10a operated with activated carbon with a particle size of about 1.4 and 0.7 mm respectively, the filter 6 being charged with activated carbon particles with a particle size of approximately 2 mm. In each of the adsorption filters 10 and 10a, the residence time is 15 minutes. The effluent recovered at 11 has a KMnO$_4$ value of 2.1 mg per liter and is free from ammonium ion (NH$_4$+). The purified effluent is then pumped into the water supply network with chlorination at 0.05 mg per liter chlorine.

The activated carbon charge of filter 10 is continuously withdrawn into a hopper fed to a rotary reactivating kiln 12 and returned at 14 to the filter 10a. From filter 10a, activated carbon may be passed as represented by dot-dash line 13a to filter 10. The feed of the activated carbon from the adsorption filter to the regenerating installation is represented at 13. It follows that the regeneration, which is complete in 30 to 90 days, is carried out continuously and in counterflow to the liquid stream. The filling of filter 10 can be continuous or intermittent and we may provide for a storage and sorting vessel in which the reactivated carbon particles are graded as to size and charged into the appropriate chamber. The system may also be operated with a pair of reserve filters which may be charged with the activated carbon particles during the continuous regeneration and, when filled, are switched into the treatment bath. Furthermore, the filters 10 and 10a can be operated alternately so that, for example, while the activated carbon mass in 1 is regenerated, the effluent is introduced into the other. Finally, we may construct the adsorption stage with a single tower subdivided into the beds 10 and 10a which are movable and are continuously regenerated as previously described. The beds may be separated to allow grading of the activated carbon by particle size, as previously described.

The improvement described and illustrated is believed to admit of many modifications within the ability of persons skilled in the art, all such modifications being considered within the spirit and scope of the invention except as limited by the appended claims.

We claim:

1. A process for producing drinking water, comprising the steps of:
   a. oxygenating a raw ground or surface water containing organic contaminants to produce oxygenated raw water;
   b. passing said oxygenated raw water free from disinfectant through a large-particle-size substantially undisturbed nonregenerated activated carbon bed with a specific loading of less than substantially 4 hr$^{-1}$ and in the absence of disinfectant to produce a first effluent by biological action upon the water in said bed;
   c. passing said first effluent through at least one activated carbon adsorption filter bed with a smaller particle size to produce a second effluent;
   d. introducing the sterilization equivalent of at least 0.05 mg of chlorine per liter into said second effluent to produce a purified drinkable water; and
   e. continuously regenerating the activated carbon of said adsorption filter bed.

2. The process defined in claim 1, further comprising the step of:
   f. oxygenating said first effluent prior to introducing it into said adsorption filter bed.

3. The process defined in claim 2 wherein said adsorption filter bed includes a plurality of activated carbon layers traversed in series by the oxygenated first effluent and of progressively smaller particle size.

4. The process defined in claim 2, further comprising the step of:
   g. passing the activated carbon generally countercurrent to said second effluent in step (c), the activated carbon being withdrawn for regeneration in step (e) at a location relatively proximal to the inlet of the second effluent to said adsorption filter bed and being returned upon regeneration to said adsorption filter bed at a point relatively proximal to the location at which said second effluent is discharged from said adsorption filter bed.

5. The process defined in claim 4 wherein said specific loading is between substantially 3 hr$^{-1}$ and 1 hr$^{-1}$.

6. The process defined in claim 5 wherein between 0.05 and 0.5 mg of chlorine is added per liter of said second effluent in step (d).

7. The process defined in claim 6 wherein the particle size of the activated carbon particles in said nonregenerated bed is between 1.5 and 5 mm, and the particle size of the activated carbon particles in said adsorption filter bed is between 0.5 and 2.5 mm.

8. The process defined in claim 7 wherein said raw water and said first effluent are oxygenated by trickling same countercurrent to an oxygenated gas stream.

* * * * *